Sept. 23, 1952   H. W. JOHNSON ET AL   2,611,213
U CONTROL TOY AIRPLANE
Filed Nov. 12, 1949   3 Sheets-Sheet 1
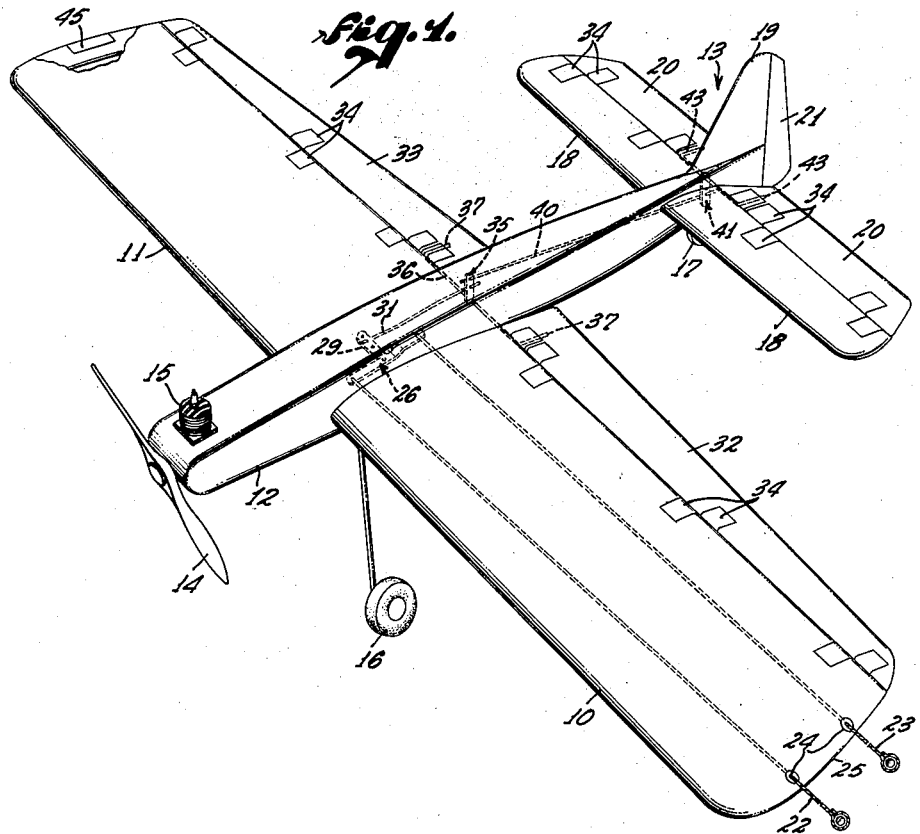
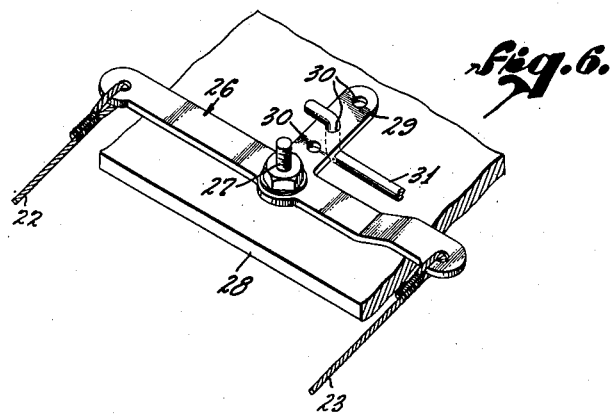
HOWARD W. JOHNSON &
ROBERT L. PALMER,
INVENTORS.
BY George W. Smyth
ATTORNEY.

Sept. 23, 1952  H. W. JOHNSON ET AL  2,611,213
U CONTROL TOY AIRPLANE
Filed Nov. 12, 1949  3 Sheets-Sheet 2
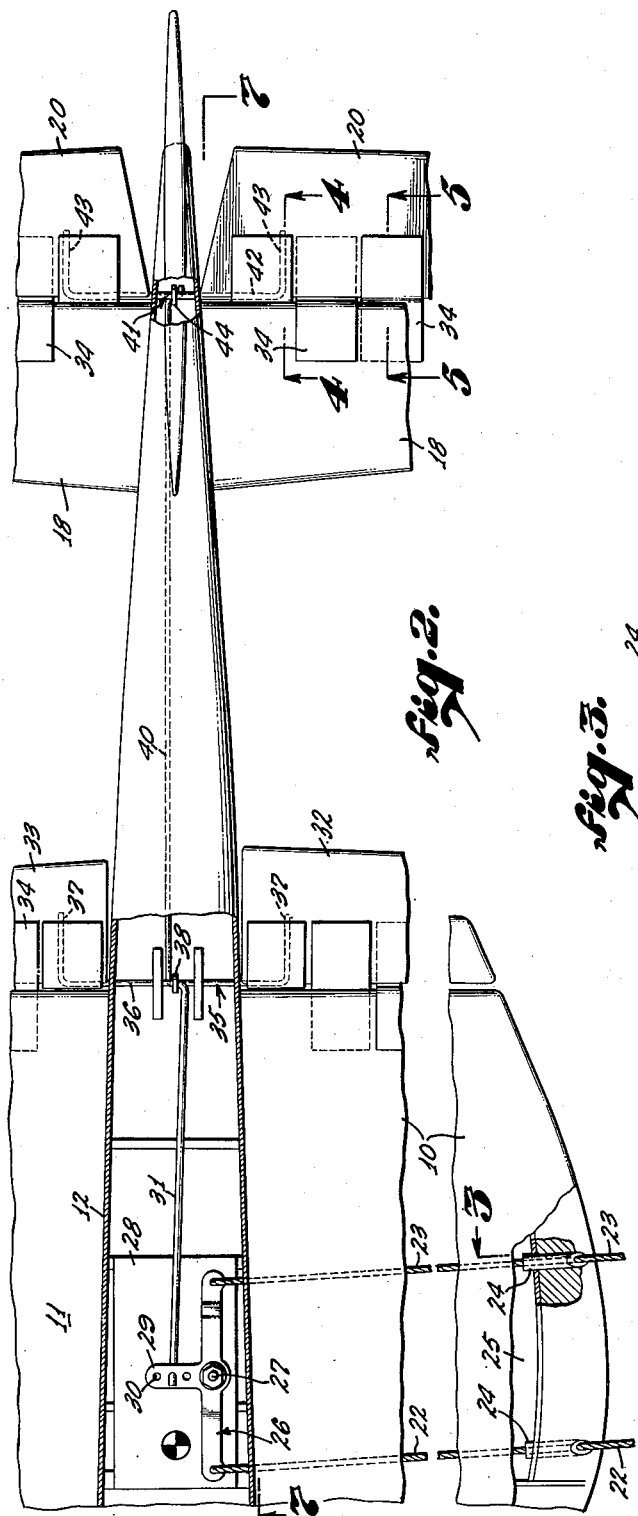
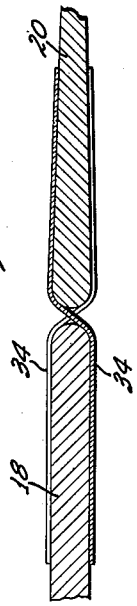
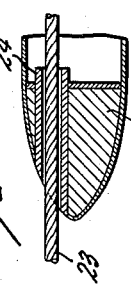
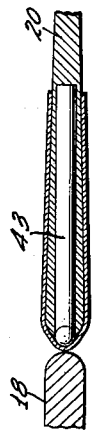
HOWARD W. JOHNSON &
ROBERT L. PALMER,
INVENTORS.
BY *George J. Smyth*
ATTORNEY.

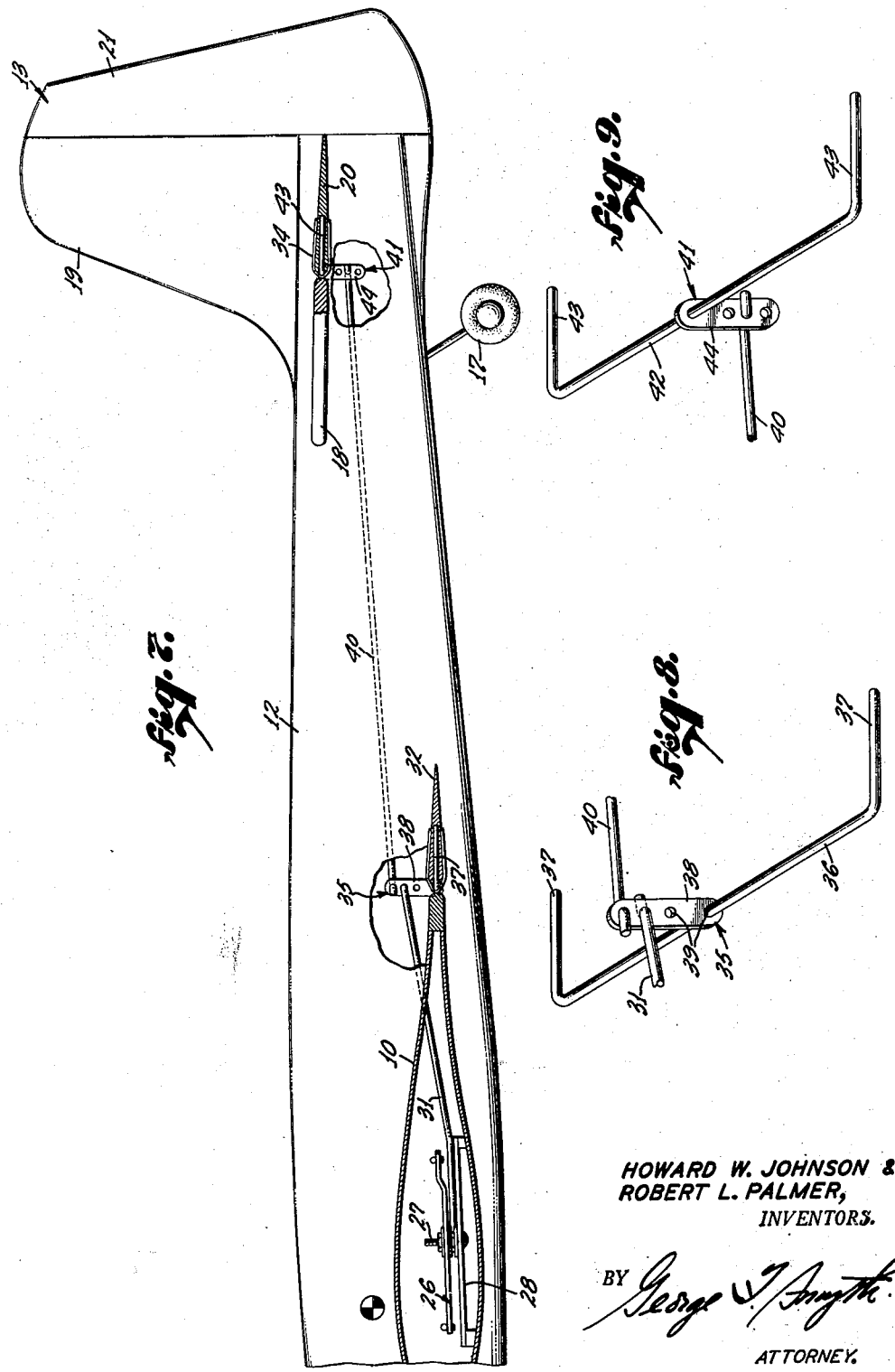

Patented Sept. 23, 1952

2,611,213

UNITED STATES PATENT OFFICE 2,611,213

U CONTROL TOY AIRPLANE

Howard W. Johnson and Robert L. Palmer, Burbank, Calif., assignors to Henry Engineering Company, Burbank, Calif.

Application November 12, 1949, Serial No. 126,856

6 Claims. (Cl. 46—77)

This invention relates to miniature, or model, airplanes and particularly to those that are self-propelled or power-driven but are held captive, or tethered, by the control lines manipulated by the "pilot" thereof standing on the ground at the center of the circular overhead flight path.

One of the operating difficulties at this time in such airplanes is the tendency of the latter to yaw inwardly when the control lines are manipulated. Although high-speed present day miniature airplanes generate a fair amount of centrifugal force, this force is not usually sufficient to neutralize this tendency, especially when the latter is augmented by thermal currents and gusts or suddenly decreased propeller torque arising from engine slow-downs. When these inward yaws occur, they lessen the tension in the control lines and deprive the pilot of proper control and the now uncontrolled airplane may dive into the ground.

Currently, the sole approach toward a solution of this problem consists in setting the rudder oppositely to the direction in which the airplane is to circle—right rudder being employed if the flight path is to the left, or counterclockwise, and vice versa. This rudder setting creates a tendency for the airplane to fly along lines tangent to points of the circular path, whereby to generate an outwardly acting force theoretically adequate to maintain the pilot's control lines taut and enable proper control.

This presents other problems, however, for the airplane is banked inwardly in its circular flight and since the ship carries "opposite rudder" setting to apply the tangentially generated tensing-force, unless the radius of turn is rendered very short, that is, unless it goes into a vertical bank or "flipper turn," a very definite possibility exists that the airplane may sideslip inwardly and downwardly, again slackening the control lines. Since no ailerons are usually provided in these craft, banking and sideslipping are somewhat difficult to control and, in fact, are always a problem.

Miniature airplanes heretofore proposed are also rather difficult to take-off and to land properly and in no event are these evolutions easy matters, since the engine is usually set at the outset at its maximum rate of operation and remains in this condition until grounded and as the elevators alone are controllable they are inadequate to raise the nose properly and easily at take-off or to set the tail down quickly yet gently in landing.

"Aerobatics" (aerial acrobatics), or vertical maneuvers, with the present day toy airplanes are virtually non-existent or ignorable, for their elevator action is insufficient for vertical maneuvers and they have no ailerons and hence cannot properly Immelmann, split-S, roll, "flipper turn," or perform any true acrobatics involving lateral force-couples, singly or in combination with elevator or rudder forces, and simple elevator "zooms" are not spectacular. However, in order to outstand from the ruck it is desirable that they perform at least a few "vertical maneuvers," such as simple but controlled dives, tail stalls, loops, inverted flying, or the like.

Subsistent miniature airplanes are not truly "clean" aerodynamically, for one reason because the control fittings protrude and the control lines lie on the outside of the wing, and sometimes, of the fuselage. Since the speed of the present airplane is upwards of 70 M. P. H., the parasitic drag created by the control lines and fittings wastes gasoline, besides presenting an unattractive, unrealistic appearance.

The invention disclosed herein remedies this and other defects and, by the construction and configuration hereinafter described, provides a miniature airplane of very definitely improved performance, control, stability and appearance. The controls can be manipulated any reasonable or necessary amount without causing appreciable yawing and the control lines are maintained taut and quick-acting, or "hot," at all times. Broadly, this end is achieved, without necessarily applying a rudder-set, by means subjecting the airplane to a constant outward-rolling force sufficient at all times to exert tension on the control lines and keep them taut. Generally, this outward rolling tendency is created by generating a greater lift in the inner wing than in the outer wing or disposing the center of lift of the inner wing further outwardly from the longitudinal center line of the airplane than the center of lift of the outer wing. Among the means for implementing this concept may be mentioned those of designing the inner wing with a span considerably greater than that of the outer wing while maintaining the chord of the wing body the same in both wing halves; conferring "wash-in," or increased angle of incidence, on the inner wing; giving the inner wing-half a more efficient lift section; slats, slots; or the like. By eliminating the necessity for rudder-setting, the invention obviates the tendency to side-slip even if the turning radius is large.

The miniature airplane of the present invention can be taken off and landed in a much shorter run than previously proposed ones and can perform "vertical aerobatics," such as loops, inversions, and flying on its back, power dives, "zooms," tail stalls, and tail "whips." To this end, the elevators are constructionally and operationally coupled with additional control and lift surfaces, or flaps, on the trailing edge of the wing in such a manner that the trailing edge surfaces deflect oppositely to the elevator deflection.

This novel use in miniature airplanes of wing trailing edge flaps connected to rotate in the same direction and coupled with the elevators for rotation concurrently therewith but in directions opposite thereto provides a magnified rate of ascent and descent of the airplanes. When the flaps are lowered they greatly increase the camber and consequently the lift of the wing. At the same time the center of lift moves rearwardly and the craft tends to nose down because the center of lift moves behind the center of gravity.

This tendency is overcome by raising the elevators to some extent, producing a tail down moment. Since the lever arm of the elevators is much greater than the lever arm of the displaced center of lift, balance is achieved with very little loss of total lift. Hence the craft can climb very rapidly even when heading horizontally. Further depression of the flaps beyond an optimum angle produces some additional lift but very little further shift in the center of pressure. The corresponding increase in the angle of the elevators produces a substantial increase in the tail down moment which is sufficient to head the craft upwardly at a steep climbing angle to produce an even greater rate of climb. Raising the flaps and lowering the elevators produces the opposite reactions. It will thus be seen that the craft can be made to take off and land much more quickly than conventional types and can more readily perform the various "vertical aerobatic" maneuvers. Moreover, the coupling between the flaps and the elevators is so constructed and configured that the degree of throw of these surfaces can be pre-varied at will to vary the magnitude of such turning movement, thereby to alter the response of the craft to a given pull on the control lines.

In most miniature airplanes, the control lines extend either at a right angle to the rear portion of the fuselage or at an angle greater than a right angle, so that, especially if the pilot and control lines "lag" behind the flight position of the airplane, the control lines act about a relatively long spanwise lever arm and hence accentuate the yaw tendency. In this invention, the control lines are inclined somewhat rearwardly to the spanwise axis of the wing and hence define an included angle less than a right angle with the rear portion of the fuselage, so that the yaw-producing arm is considerably reduced, thus reducing the yaw tendency to the minimum.

In previously proposed toy airplanes, the control lines are laid along the outside of the inner wing and in some cases also extend back to the elevator along the outside of the fuselage. The lines hence are rearwardly urged by the relative wind movement and their manipulation is hampered; they increase the parasitic drag materially, and give the airplane an "unnatural" or unrealistic appearance. The control lines of the airplane of the present invention lie entirely within the wing and fuselage, and being unexposed to the airstream, are not "bellied rearwardly" thereby, thus facilitating their operation and allowing the aerodynamic design of the craft to be rendered almost ideal, being "clean" and streamlined.

Other features and advantages of the toy airplane of the present invention will be hereinafter apparent from the following description, particularly when taken in connection with the accompanying drawing, in which:

Fig. 1 is a three-quarter front perspective view of the airplane of the present invention;

Fig. 2 is an enlarged top-plan view thereof, partly fragmentary and partly in horizontal section;

Fig. 3 is a detailed spanwise section of the wing tip taken on line 3—3 of Fig. 2;

Fig. 4 is a detailed chordwise section of the horizontal surfaces of the empennage, taken on line 4—4 of Fig. 2;

Fig. 5 is a similar view taken on line 5—5 of Fig. 2;

Fig. 6 is an elarged perspective view of the control walking beam, that is, force-direction changing means associated with the pilot's control lines and with the wing-and-empennage control surfaces;

Fig. 7 is a section taken along line 7—7 of Fig. 2 with a part of the fuselage broken away to illustrate the control surfaces and their correlated and cooperative bell-crank and adjustable link operating mechanism;

Fig. 8 is a detailed enlarged three-quarter front perspective view of the adjustable throw or variable lever arm control force-connecting and applying variable arm linkage for operating the novel wing-mounted control surface; and Fig. 9 is a similar view of the variable-arm force-connecting and applying means for the elevators.

A typical miniature airplane in which the improvements constituting the present invention are incorporatable is shown as basically including, in the manner usual in this field, a wing consisting of a pair of monoplane wing-halves 10 and 11 and supporting a fuselage 12 terminating rearwardly in an empennage 13 and ending forwardly in a propeller 14 rotated by a miniature internal combustion engine 15, the airplane being locomotive, for landing and take-off, on a pair of cantilever-mounted main ground wheels 16 and a cantilever-mounted tail wheel 17.

The empennage, in the usual manner, consists of fixed horizontal surfaces or stabilizers 18, a fixed vertical stabilizer of fin 19, a pair of elevators 20 and a rudder 21. The wing-halves are mounted in the "high mid-wing" position, have a relatively deep chord, and are of improved airfoil section.

The inner wing 10, that is, the one which usually extends toward the ground pilot and thus lies inwardly of the circular flight path, has the same airfoil section and substantially the same chord, and is set at the same angle of incidence, as the outer wing 11, but its span or length is considerably, and substantially, greater than that of the outer wing. Consequently, the total lift of the inner wing-half is greater than that of the outer one, so that the airplane constantly tends to roll outwardly about its longitudinal axis. As the inner wing is always tethered into a bank, however, it cannot rise and instead the entire airplane tends to shift bodily outward. As a consequence, the pilot's control lines will be subjected to tension so that any control surfaces to which they are operatively attached will respond immediately at all times to manipulations of the lines.

With this environment for a setting, a pair of oppositely acting control lines 22 and 23 adapted to be held and manipulated by the pilot are passed into and through fairleads or guides 24 in the inner wing tip. These lines confine the flight of the airplane to a circular path and as the craft normally flies above the pilot, retain it inwardly banked. The fairleads or guides 24 are mounted in spanwise attitude in chordwise separated stations in the wing tip members 25. The control lines lead through the wing 10 to the opposite terminals of a horizontally disposed double-armed crank 26, the latter being pivotally mounted on a vertical axis 27 carried by a platform 28, with the force-transmitting arm 29 directed athwartship. The connections of the lines may be established in any suitable fixed manner, but the force-transmitting connection is established in a variable-arm manner by means including a plurality of apertures 30 spaced longitudinally of the arm 29.

In one or the other of these apertures is engaged a rearwardly and upwardly directed rigid link 31 for transmitting control forces to the control surfaces, all of which are located rearwardly of the center of gravity of the craft.

In keeping with the aim of providing better take-off and landing and enabling the craft to perform vertical aerobatics, the trailing edge of each wing half carries a fullspan, airfoil section-type trailing edge flap, the left one 32 being obviously of greater span than the right one 33. These flaps are pivotally mounted for upward and downward deflection by any suitable means, the illustrated form consisting of flexible or pliant but durable plates or sheets 34 disposed chordwise and alternately anchored at their one end to the upper face of the anterior airfoil's surface and anchored at their opposite end to the lower face of the posterior airfoil's surface, so that deflections of said anterior surface in the one direction are borne by one set of plates 34 and the other set of plates takes deflections in the opposite direction.

To establish an operating or force direction changing and applying connection with the flaps, a variable link-and-torque rod unit 35 is employed. As seen best in Fig. 8, this unit comprises a rigid rod 36 disposed transversely of the fuselage through the sides of which it pivotally extends and is anchored at each of its rearwardly bent opposite ends 37 in the leading edge at the inner end of a flap. At the medial portion of the rod 36 a vertical lever arm 38 is fixed by its lower end and its free portion bears a plurality of vertically spaced apertures 39 into each of which, except one, the rear hooked end of link 31 is adapted to be engaged. Thus rearward and forward oscillations of arm 29 are transformed into downward and upward deflections of both flaps in synchronism.

From one or the other of the apertures 39 a rigid link 40 extends rearwardly and upwardly to a unit 41 similar to, but the reverse in rotational effect to, the unit 35. It similarly consists of a torque rod 42 attached at its rearwardly bent ends 43 to the adjacent inner ends of each of the two elevators 20, but the variable stroke lever arm 44 fixed to the medial portion of the rod depends downwardly instead of upwardly so that longitudinal rearward forces applied thereto raise the elevators, and vice versa.

It will now be apparent that a pull on line 23 will depress the flaps and raise the elevators so that if the craft is taking off extra lift will be generated by flap action on the wings, which raises the nose, while the elevators will depress the tail, expediting take-off and rendering the craft airborne in an unusually short time with the minimum take-off run. If the craft is in the air when line 23 is pulled, the craft can be made either to execute a "loop" or invert onto its back for inverted flight. By a gentler pull on line 23 and a "meeting" pull on 22 it can be made to "zoom," to vertically climb or "tail stall," and other vertical aerobatics.

A pull on line 22 will, of course, raise the flaps and depress the elevators, which combination of forces will enable the craft to make a "flap-landing" and enables the tail to be set down properly on landing. It also enables inverted loops, vertical dives and the like.

The outer wing 11 bears a counterweight 45 such as a small mass of lead or the like in its tip member in order to counterbalance the weight of the control lines and guides. Since the control lines pass directly into the interior of the wing 10, the guides therefor also lie inside the wing and the control lines pass inwardly therefrom entirely inside the wing; the usual turbulence-creating protrusions on the wing formed by the control lines and guides therefor are eliminated and this fact, coupled with the "clean" design of the rest of the craft, reduces its drag considerably below prior miniature airplanes.

The flap 32 carried by the longer wing 10 naturally has a greater span than the outer flap and is also provided with a greater chord and hence exerts more lift and drag, on respective occasions, than does the outer flap. The resultant "overcontrol," added to the extra lift of the inner wing, reduces the pull necessary to be applied to the control lines to effectuate a desired maneuver and concurrently overcomes the extra tendency of the craft to yaw inwardly, or "fall off to inward," when executing "loops," so that the craft performs its loops as "perfect circles." Moreover, since the inner wing is longer, larger and heavier than the outer one, more lift is needed to be exerted by the inner flap than the outer one to keep the wing "up" in level attitude with the right one in landing and take-off, in loops, inverted flying, etc. This is effectuated by the extra chord length, as mere extra span would not accomplish this. For, the lift increase is effectuated by the "droop" and since both flaps droop the same, the inner flap must be given a greater chord length to give a greater lift in take-off and a greater drag on landing.

Because of the greater lift of the inner wing due to its greater chord and span, setting up an outward rolling movement, or couple, whatever bank the craft is put into by the pilot is maintained substantially constant at all times, since any increase in bank sets up a restoring movement, the two movements neutralizing in the desired angle of bank.

It is to be observed that although the weight and reaction of the control lines exert a tendency to hold back and down the inner wing somewhat, this tendency is neutralized by the extra span and chord of the inner flap, producing aerodynamic reactions sufficiently greater than those produced by the outer flap to nullify this hold back or hold down.

The control line guides or fairleads are so carried by the wing tip member that the control lines extend along a line inclined somewhat rearwardly to the spanwise axis of the inner wing half. Thus the angle included between said line and the longitudinal axis of the rear portion of the airplane fuselage is less than a right angle and the vector of the control pull, projected on said longitudinal axis, is less than if the included angle were a right angle. Thence, said control pull will have a smaller lever arm for pulling the craft inwardly off its course than is the case in the ordinary miniature airplane, and this fact, coupled with the other anti-yaw provisions, provides a directionally stable craft.

Various equivalent means well-known in the aerodynamic art and in machine-design practice are contemplated by the invention as substitutable in place of those hereinabove decribed by way of example, without passing beyond the bounds of the present inventive concepts. For example, instead of securing greater lift on the inner wing by enlarging its span, this result may be achieved by giving the inner wing a greater angle of incidence, or "wish-in"; by giving it a more efficient lift-section than the outer wing; by wing-slots, and flap-slots, or other equivalent aerodynamic means. Furthermore, many of the advantages gained by the particular constructional arrangements herein shown and described are also had when such arrangements are incorporated into toy aircraft of non-conventional design, such as pusher and flying wing types.

Although the now preferred embodiment of the present invention has been shown and described herein, it is to be understood that the invention is not to be limited thereto, for it is susceptible to changes in form and detail within the scope of the appended claims.

We claim:

1. A captive type model airplane, comprising: a fuselage; a wing laterally extending outwardly from each side of said fuselage; a control surface coextensive with the trailing edge of each wing; means hingedly connecting one of said surfaces to the trailing edge of each wing; a continuous torque rod extending laterally from the fuselage to each side thereof with its free ends fixedly engaged one with each of said flaps respectively whereby rotation of said torque rod about its axis will rotate both of said flaps in the same direction; operating means connected to said torque rod to produce rotation thereof; a flexible control line defining the radius of flight of said airplane; and means securing said line to said operating means whereby an operator can conjointly move said surfaces in the same direction to maneuver said airplane in flight.

2. A captive type model airplane, comprising: a fuselage; a main supporting and lifting surface including a pair of oppositely extending wing sections; a flap hingedly mounted to the trailing edge of each wing section; a slender, elongate, wire-like torque rod carried by said fuselage and extending laterally outward therefrom to each side thereof for rotation about its own laterally extending axis; the free ends of said rod being rearwardly bent and being secured to said flaps to rotate both of them concurrently at all times in the same direction upon rotation of said rod about its own axis; crank means on said rod within said fuselage; control means operatively connected to said crank means; a flexible control line defining the radius of flight of said airplane; and means securing said line to said control means whereby an operator can actuate said control means to move said flaps in the same direction during flight of said airpline.

3. A captive type model airplane, comprising: a fuselage; a pair of wings laterally projecting from said fuselage; a flap hingedly mounted to the trailing edge of each wing; means mounted within said fuselage for controlling movement of said flaps; a flexible control line defining the radius of flight of said airplane; and means for securing said line to said control means whereby an operator can acutate said controlling means to selectively move said flaps during flight of said airplane; said line passing spanwisely through said wing; guide means carried by the outer end of said wing for passing said line outwardly therethrough; and a weight carried by the other of said wings adjacent the outer end thereof to counterbalance the weight of said line and said guide means.

4. A captive type, power-driven toy airplane, comprising: a fuselage including an empennage; a wing laterally extending from each side of said fuselage; a flap hingedly mounted to the trailing edge of each wing; a pair of elevators hingedly mounted on said empennage; a lever pivotally mounted intermediate the ends thereof within said fuselage; linkage means movable with said lever and interconnecting said lever and flaps whereby movement of said lever in a first direction moves said flaps upwardly and movement of said lever in the opposite direction moves said flaps downwardly; link and lever means so interconnecting said linkage means and said elevators that movement of said lever in the first direction produces downward movement of said elevators and movement of said lever in the opposite direction produces upward movement of said elevators; a pair of control lines defining the radius of flight of said airplane connected respectively to opposite ends of said lever and adapted to pivotally move said lever in one direction or the other for controlling movement of said flaps and elevators; a pair of guide means carried by the outer end of the wing extending inwardly of the circular flight path of said airplane defining openings through which said lines are passed; the wing carrying said guide means being so aerodynamically formed that the lift thereof is greater than the lift of the other wing, thereby tending to cause said airplane to roll outwardly of said circular path whereby said lines are maintained taut and operative to pivotally move said lever; and a rudder arranged parallel to the longitudinal axis of the fuselage to maintain the heading of the airplane tangent to said circular path and to prevent yawing thereof.

5. A captive type model airplane, comprising: a fuselage, a wing laterally extending from each side of said fuselage; a flap hingedly mounted to the trailing edge of each wing; a torque member extending laterally with respect to said fuselage and carried thereby for rotation about a laterally extending axis, with one free end of said torque member connected to each of said flaps to constrain them to rotate concurrently only in the same direction about their hinged mountings; a lever carried by said torque member; an elevator hingedly mounted at the rear of said fuselage for rotation about a laterally extending axis; a lever connected to said elevator; link means connecting said levers to cause rotation of said elevator in one direction when the flaps rotate in the opposite direction; control means carried by said fuselage and connected to the lever on said torque member to produce rotation thereof; and a flexible control line defining the radius of flight of said airplane and having an end thereof secured to said control means to actuate said flaps and, in turn, said elevator to maneuver said airplane.

6. A captive type model airplane as claimed in claim 5 in which said levers are provided with means for connection to said link means at a plurality of positions along their lengths to produce a preselected ratio of the angular movements of said flaps and said elevator.

HOWARD W. JOHNSON.
ROBERT L. PALMER.

REFERENCES CITED

The following references are of record in the file of this patent:

UNITED STATES PATENTS

| Number | Name | Date |
|---|---|---|
| 1,507,710 | Pohlman | Sept. 9, 1924 |
| 1,848,809 | Upson | Mar. 8, 1932 |
| 2,061,953 | Sampson | Nov. 24, 1936 |
| 2,303,965 | Walker | Dec. 1, 1942 |
| 2,323,506 | Willard | July 6, 1943 |
| 2,416,805 | Walker | Mar. 4, 1947 |
| 2,454,598 | Doyle | Nov. 23, 1948 |
| 2,527,274 | McIntyre | Oct. 24, 1950 |
| 2,559,049 | St. Clair | July 3, 1951 |